(12) United States Patent
Gurney

(10) Patent No.: US 10,024,409 B2
(45) Date of Patent: Jul. 17, 2018

(54) NECKED IMPELLER SHELL FOR TORQUE CONVERTER

(71) Applicant: Schaeffler Technologies GmbH & Co. KG, Herzogenaurach (DE)

(72) Inventor: Nigel Gurney, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 285 days.

(21) Appl. No.: 14/534,267

(22) Filed: Nov. 6, 2014

(65) Prior Publication Data

US 2016/0131236 A1   May 12, 2016

(51) Int. Cl.
| F16H 41/00 | (2006.01) |
| F16H 41/24 | (2006.01) |
| F16H 41/04 | (2006.01) |
| F16H 45/02 | (2006.01) |
| F16H 45/00 | (2006.01) |

(52) U.S. Cl.
CPC ............. *F16H 41/24* (2013.01); *F16H 41/04* (2013.01); *F16H 45/02* (2013.01); *F16H 2045/007* (2013.01); *F16H 2045/0226* (2013.01); *F16H 2045/0294* (2013.01)

(58) Field of Classification Search
CPC .. F16H 41/24; F16H 41/04; F16H 2045/0294; F16H 2045/007; F16H 2045/0226; F16H 45/02; F16H 2041/243; F16H 2041/246; F16D 33/00; F16D 33/18; F16D 33/20; F16D 33/02; F16D 33/04; F16D 33/06; F16D 33/08; F16D 33/10; F16D 33/12; F16D 33/14; F16D 33/16
See application file for complete search history.

(56) References Cited

U.S. PATENT DOCUMENTS

| 2,630,683 | A | * | 3/1953 | Wemp | F16D 33/20 416/180 |
| 3,250,222 | A | * | 5/1966 | Zeidler | F16H 41/28 220/681 |
| 3,824,038 | A | * | 7/1974 | Tokunaga | F16H 41/30 416/180 |
| 3,838,611 | A | * | 10/1974 | Koivunen | F16H 47/085 475/136 |
| 5,975,261 | A | * | 11/1999 | Woerner | F16F 15/1207 192/212 |
| 6,364,777 | B1 | * | 4/2002 | Kundermann | F16D 13/68 464/98 |
| 6,494,303 | B1 | * | 12/2002 | Reik | F16H 45/02 192/212 |
| 8,176,733 | B2 | | 5/2012 | Schrader | |
| 2004/0128992 | A1 | * | 7/2004 | Fukunaga | F16H 41/26 60/361 |
| 2005/0211523 | A1 | * | 9/2005 | Takahashi | F16H 45/02 192/3.29 |

(Continued)

*Primary Examiner* — Thomas E Lazo
*Assistant Examiner* — Dustin T Nguyen
(74) *Attorney, Agent, or Firm* — LeKeisha M. Suggs

(57) ABSTRACT

An impeller for a torque converter comprising: an axis of rotation; an impeller shell comprising: a torus portion; a radial wall portion; an elbow portion; an interior portion; and, an axially extending necked portion, extending about the axis of rotation and into the interior portion, having: a first circumferential surface; and, a second circumferential surface.

12 Claims, 4 Drawing Sheets

(56) References Cited

U.S. PATENT DOCUMENTS

| | | | |
|---|---|---|---|
| 2007/0131506 A1* | 6/2007 | Wack | F16F 15/12366 |
| | | | 192/3.29 |
| 2007/0144162 A1* | 6/2007 | Ochi | F16H 41/24 |
| | | | 60/345 |
| 2009/0139817 A1 | 6/2009 | Schrader | |
| 2012/0090936 A1* | 4/2012 | Kawahara | F16F 15/12366 |
| | | | 192/3.28 |
| 2013/0160438 A1* | 6/2013 | Ersahin | F16D 33/20 |
| | | | 60/364 |

\* cited by examiner

NECKED IMPELLER SHELL FOR TORQUE CONVERTER

FIELD

The invention relates generally to torque converters and more specifically to impeller shells for torque converters that include an elbow portion and a necked portion that extends into the interior portion of the impeller shell.

BACKGROUND

Flanged covers or hubs are previously known for torque converters. U.S. Pat. No. 6,494,303, hereby incorporated by reference herein, discloses a flange-like housing stub, extending in the direction of the transmission, for rotatably supporting the housing. U.S. Pat. No. 8,176,733, hereby incorporated by reference herein, discloses a cover having an axially extending flange bending inward towards a turbine hub to support a ball bearing.

BRIEF SUMMARY

Example aspects broadly comprise an impeller as provided. An impeller for a torque converter comprises: an axis of rotation; an impeller shell comprising: a torus portion; a radial wall portion; an elbow portion; an interior portion; and, an axially extending necked portion, extending about the axis of rotation and into the interior portion, having: a first circumferential surface; and, a second circumferential surface. In an example aspect, the elbow portion connects the axially extending necked portion to the radial wall portion at an angle of about 90 degrees. In an example aspect, the impeller shell further comprises an inner peripheral surface and an outer peripheral surface. In an example aspect, the impeller further comprises a plurality of blades attached to the inner peripheral surface of the impeller shell.

Example aspects broadly comprise a torque converter as provided. A torque converter comprises: an axis of rotation; a turbine; an impeller comprising an impeller shell having: a torus portion; a radial wall portion; an interior portion; an axially extending necked portion about the axis of rotation, extending into the interior portion, having: a first circumferential surface; and, a second circumferential surface; an elbow portion connecting the radial wall portion and the necked portion; and, an opening defined by the second circumferential surface; and, a stator. In an example aspect, the axially extending necked portion extends in a direction away from a transmission. In an example aspect, the torque converter is arranged for installation between an engine and a transmission, and wherein the axially extending necked portion extends in a direction toward the engine. In an example aspect, the opening is arranged for receiving a stator shaft and a transmission shaft. In an example aspect, the necked portion is at an angle of about 90 degrees relative to the radial wall portion. In an example aspect, the impeller shell further comprises an inner peripheral surface and an outer peripheral surface. In an example aspect, the impeller further comprises a plurality of blades attached to the inner peripheral surface of the impeller shell. In an example aspect, the torque converter further comprises an impeller hub attached to the outer peripheral surface of the impeller shell via a weld. In an example aspect, the weld includes a radially outward toe having reduced rotary bend stresses between the toe of the weld and the impeller shell.

Other example aspects broadly comprise a torque converter comprising: an axis of rotation; a turbine; an impeller comprising an impeller shell having: a radial wall; an axially extending neck about the axis of rotation; and, an elbow portion connecting the radial wall and the axially extending neck at an angle of about 90 degrees; a stator, and, a bearing supported by the axially extending neck. In an example aspect, the torque converter is arranged for installation between an engine and a transmission, and wherein the bearing is disposed axially between the radial wall and the engine. In an example aspect, the bearing is a roller bearing or a thrust bearing. In an example aspect, the thrust bearing is a three piece thrust bearing comprising a first hardened backing washer, a cage including rollers, and a second backing washer. In an example aspect, the axially extending neck includes first and second circumferential surfaces, the second circumferential surface defining an opening arranged for receiving a stator shaft and a transmission input shaft. In an example aspect, the impeller shell further comprises an inner peripheral surface and an outer peripheral surface. In an example aspect, the impeller further comprises a plurality of blades attached to the inner peripheral surface of the impeller shell. In an example aspect, the torque converter further comprises an impeller hub attached to the outer peripheral surface of the impeller shell via a weld, wherein the impeller hub is tubular or forged.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

The present disclosure provides an impeller shell for a torque converter having a neck extending axially in a direction toward the engine and away from the transmission. The neck may be formed integrally by extruding or 'necking' during manufacture of the impeller shell. Impeller hubs are typically attached to impeller shells by methods known in the art including, for example, welding. In an example aspect, the axially extending neck is believed to advantageously reduce stresses at the radially outward toe of the weld wherein the impeller hub is attached to the impeller shell outer peripheral surface. This results in increased durability. In another example aspect, useful for torque converters with higher torque requirements, the axially extending neck supports a bearing disposed between the impeller shell inner peripheral surface and the stator. The axially extending neck is further useful for centering the bearing. Herein, the term 'bearing' is also referred to interchangeably as 'thrust bearing', 'thrust washer', or simply as 'bearing' or 'washer'. 'Axially extending neck' is referred to as 'axially extending necked portion', 'necked portion', 'impeller shell necked portion', or 'impeller shell neck' interchangeably herein. 'Radial portion' is referred to as 'flanged portion' interchangeably herein.

Figure 1:
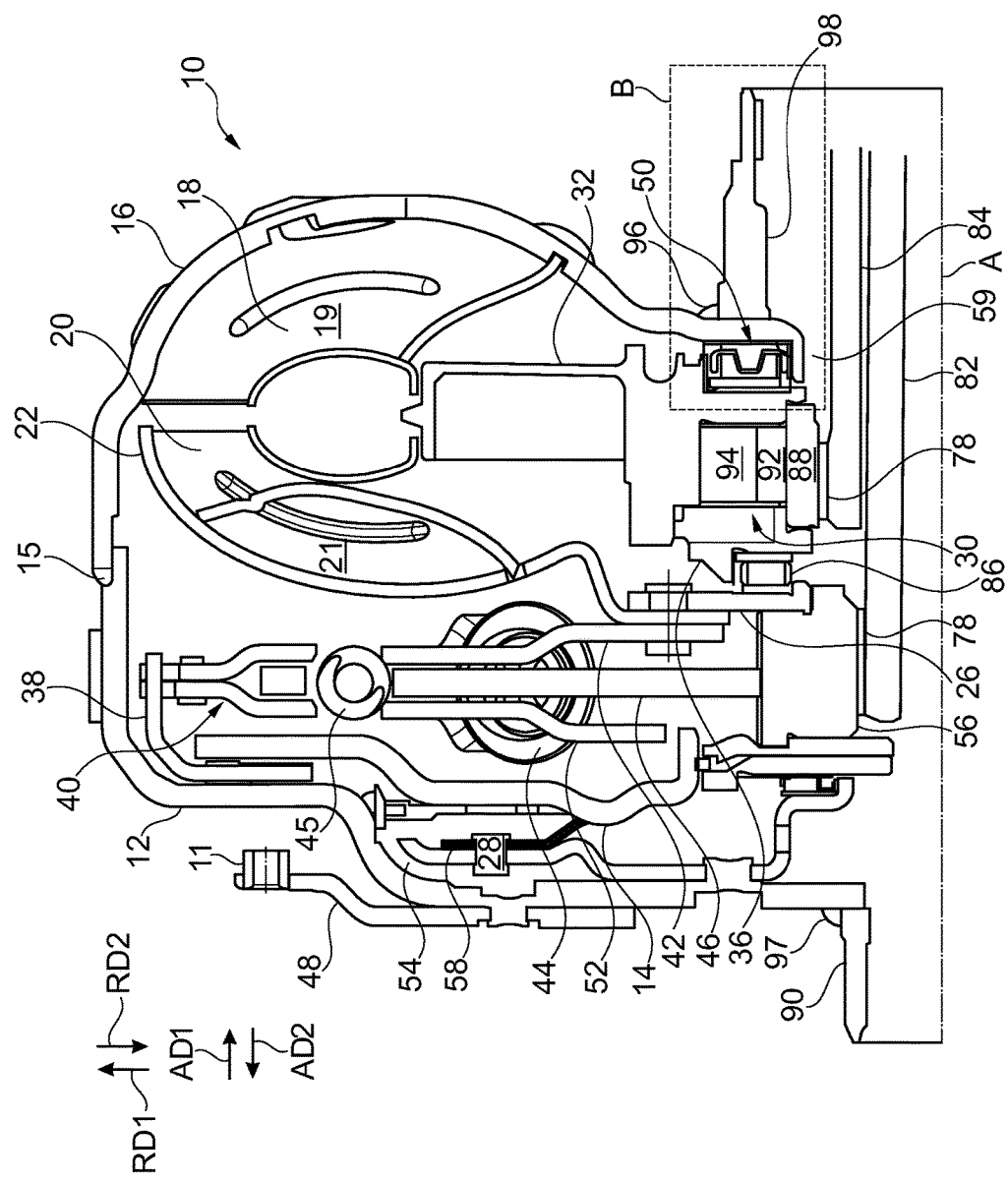
FIG. 1 illustrates a partial cross-sectional side view of a torque converter in accordance with an example aspect.
Figure 2:
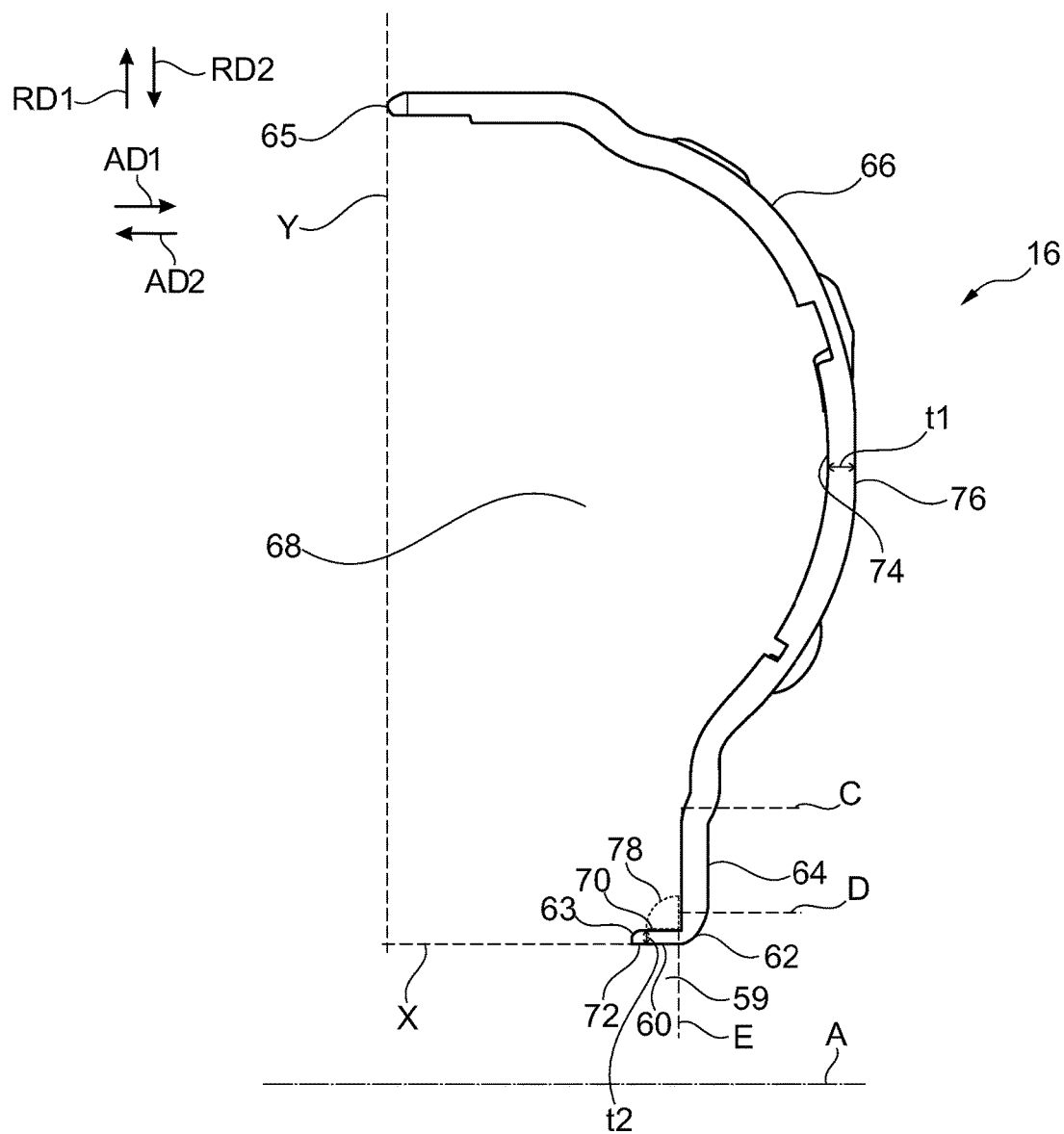
FIG. 2 illustrates a partial cross-sectional side view of an impeller shell in accordance with an example aspect.

The following description is made with reference to FIGS. 1-3. The axially extending neck of the impeller may be formed by known methods in the art, and in an example aspect, is advantageously and economically formed by stamping. In an example aspect, extruding during stamping forms the axially extending neck and, therefore, alternative methods such as machining operations are eliminated resulting in cost and time savings.

FIG. 1 illustrates a partial cross sectional side view of a torque converter including an axially extending neck according to an example aspect. Torque converter 10 includes front cover 12 for connecting to a crankshaft of an internal combustion engine via drive plate 48 and lug 11, and rear cover 16, also referred to as impeller shell interchangeably herein, for an impeller 18. Impellers are also referred to in the art interchangeably as 'pump'. Front cover 12 and rear cover 16 are fastened together via weld 15 during final assembly. Cover 12 is fixed to cover pilot 90 via weld 97. Torque converter 10 also includes turbine 20, turbine shell 22, and stator 32 between turbine 20 and impeller 18. Turbines and impellers, as is known in the art, include a plurality of blades 21 and 19, respectively.

Torque converter 10 includes one-way clutch 30, which supports stator 32, and includes inner race 88, roller 92, and outer race 94, for example. Alternatively, one-way clutch 30 may comprise an inner race and rocker as is known in the art. Side plate 36 holds one-way clutch 30 in place within stator 32. Torque converter 10 includes piston 14, clutch plate 38, drive plate 54 connected to piston 14 via leaf springs 58, and rivet 28. Torque converter 10 also includes damper assembly 40, which is connected to and drivable by turbine 20, and is positioned between turbine 20 and front cover 12. Damper assembly 40 includes spring 44, radially outward spring 45, damper flange 46, and cover plate 42 fixed to turbine shell 22, which is connected to turbine hub 26, and cover plate 52.

Torque converter 10 includes bearing 50 supported by axially extending neck portion of impeller shell 16 as will be described in greater detail in FIG. 3 showing expanded view of Box B of FIG. 1. Torque converter 10, as shown in FIG. 1, further includes bearing 86, weld 96, impeller hub 98, and damper hub 56 splined to flange 46. FIG. 1 also shows transmission components including transmission input shaft 82 and stator shaft 84. Hub 56 is splined to input shaft 82 and inner race 88 is splined to stator shaft 84 at splines 78. Torque converter 10 includes axis of rotation A, also simply referred to as axis A. The portion of torque converter 10 noted by dashed outline of box 'B' is expanded in FIG. 3.

FIG. 2 shows a partial cross-sectional side view of impeller shell 16 having axis of rotation A. Impeller shell 16 includes axially extending necked portion 60, elbow portion 62, radial wall portion 64, and torus portion 66, also referred to interchangeably as rounded portion 66. Dashed lines C, D, and E provide approximate schematic representation of the demarcation between portions of shell 16. In an example aspect, as shown in FIG. 2, impeller shell 16 integrally includes portions 60, 62, 64, and 66. Radial wall portion 64 is also referred to interchangeably as radial wall 64. Impeller shell 16 includes inner peripheral surface 74 and outer peripheral surface 76; impeller shell 16 includes thickness t1 between inner peripheral surface 74 and outer peripheral surface 76. Necked portion 60 includes first circumferential surface 70, second circumferential surface 72, neck end 63, and thickness t2 between first circumferential surface 70 and second circumferential surface 72. Necked portion thickness t2 is at most equal to thickness t1. In an example aspect, thickness t2 is less than thickness t1. Representative lines X and Y of FIG. 2 are depicted to define interior portion 68 of impeller shell 16. Line X is parallel to axis A and is aligned with second circumferential surface 72. Torus portion 66 includes torus end 65. Line Y lies is orthogonal to axis A and is aligned with torus end 65. Lines X and Y define the interior portion 68 of impeller shell 16. Necked portion 60 extends axially about axis of rotation A and into interior portion 68. To state in another way, necked portion 60 extends axially in axial direction AD2, as shown in FIG. 2.

In an example aspect, impeller 18 for torque converter 10 comprises axis of rotation A and impeller shell 16. Impeller shell 16 comprises: torus portion 66; radial wall portion 64; elbow portion 62; interior portion 68; and, axially extending necked portion 60, extending about axis of rotation A and into interior portion 68. Axially extending necked portion 60 includes first circumferential surface 70; and, second circumferential surface 72. Elbow portion 62 connects axially extending necked portion 60 to radial wall portion 64 at an angle, as represented by element 78 of FIG. 2. In an example aspect, angle 78 is about 90 degrees. Impeller shell 16 further comprises inner peripheral surface 74 and outer peripheral surface 76. Impeller 18 further comprises a plurality of blades 19, as shown in FIG. 1, attached to inner peripheral surface 74 of impeller shell 16. In an example aspect, second circumferential surface 72 defines opening 59. Opening 59, also referred to interchangeably herein as bore 59, is arranged for receiving stator shaft 84 and transmission input shaft 82.

Figure 3A:
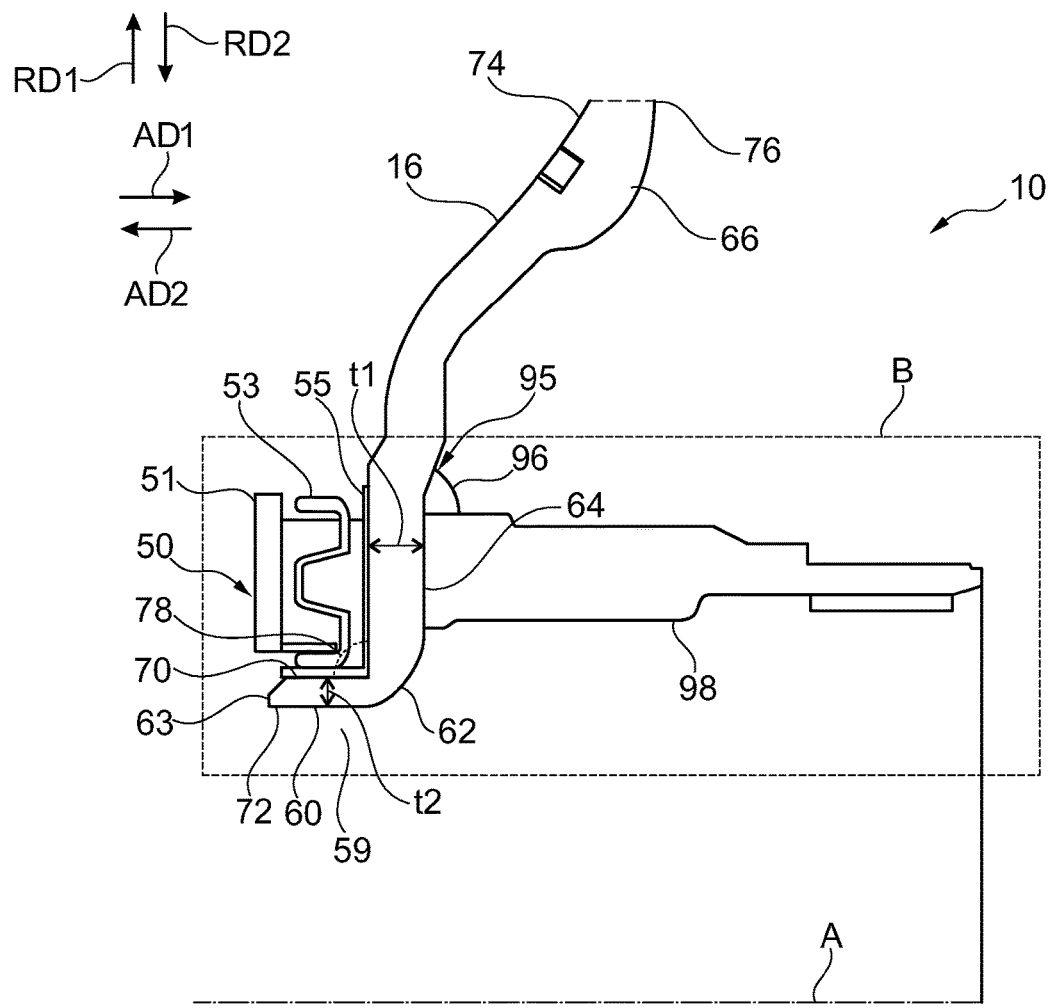
FIG. 3A illustrates an expanded cross-sectional view of an area corresponding to box 'B' of FIG. 1 including a bearing in accordance with an example aspect; and, FIG. 3B illustrates an expanded cross-sectional view of an area corresponding to box 'B' of FIG. 1 including an alternative bearing in accordance with another example aspect.
Figure 3B:
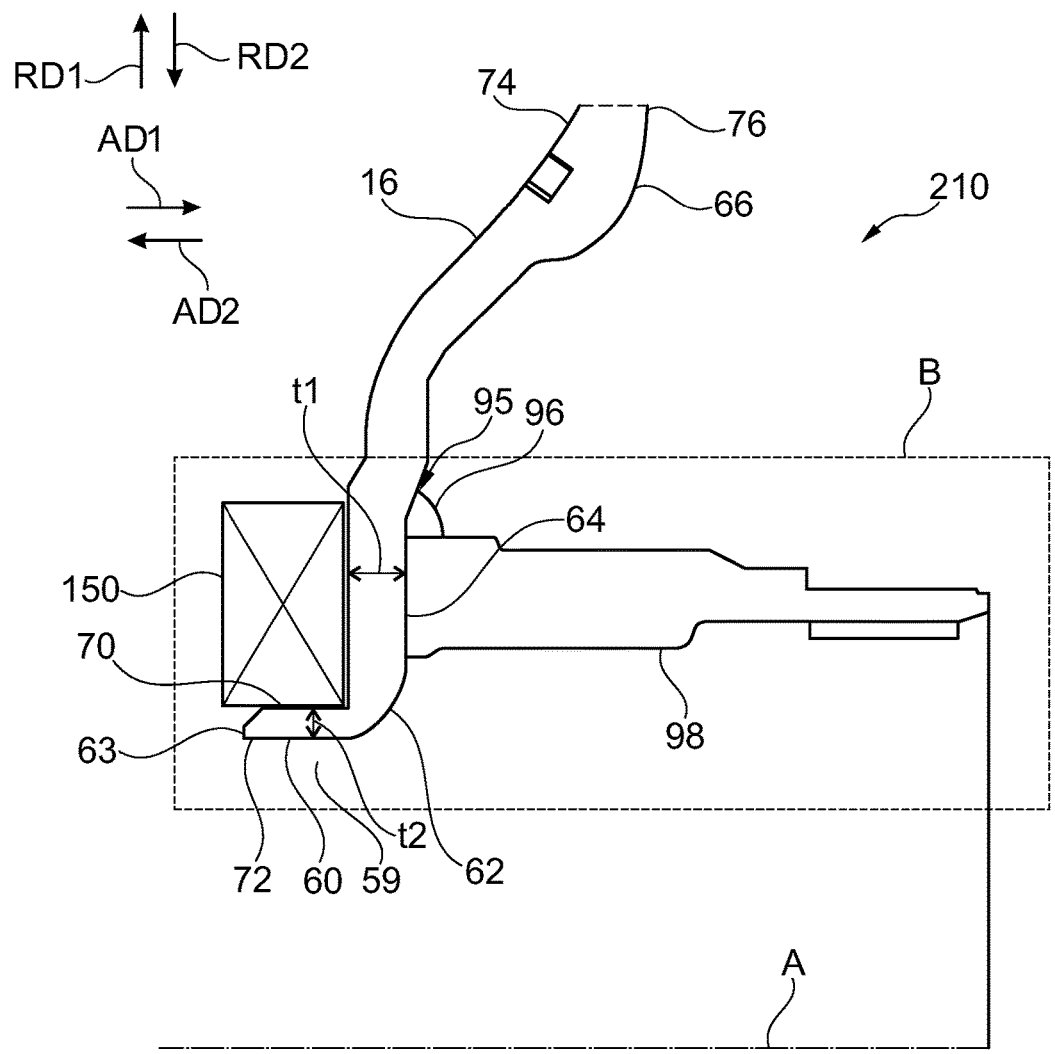

FIGS. 3A and 3B show expanded views of a partial cross-sectional side view of torque converter 10, corresponding to box B of FIG. 1, having axis of rotation A. FIG. 3A shows an example aspect including three piece thrust bearing 50. Torque converter 10 includes impeller shell 16 comprising axially extending necked portion 60, elbow portion 62, radial wall portion 64, and torus portion 66, also referred to interchangeably as rounded portion 66. Impeller shell 16 includes inner peripheral surface 74 and outer peripheral surface 76. Necked portion 60 includes first circumferential surface 70, second circumferential surface 72, and neck end 63. Interior angle 78 between radial wall portion 64 and necked portion 60 is about 90 degrees. Necked portion 60 defines opening 59 concentric about axis A. In an example aspect, bearing 50 is a three piece thrust bearing comprising first hardened backing washer 51, cage 53 including rollers, and second backing washer 55.

In an example aspect, torque converter 10 further comprises impeller hub 98 attached to outer peripheral surface 76 of impeller shell 16 via weld 96. In an example aspect, impeller hub 98 is tubular or forged as known in the art. Weld 96 is in the general region wherein radial wall portion 64 meets torus portion 66. Weld 96 includes radially outward toe 95 having advantageously reduced rotary bend stresses between toe 95 of weld 96 and impeller shell 16. This results in improved wear and durability of the impeller shell/impeller hub assembly.

FIG. 3B shows an example aspect including thrust bearing 150. In an example aspect, any suitable bearing as known by those skilled in the art may be employed such as non-limiting examples: fluid film thrust bearings, roller bearings, or slide bearings. Torque converter 210 includes impeller shell 16 comprising axially extending necked portion 60, elbow portion 62, radial wall portion 64, and torus portion 66, also referred to interchangeably as rounded portion 66. Impeller shell 16 includes inner peripheral surface 74 and outer peripheral surface 76. Necked portion 60 includes first circumferential surface 70, second circumferential surface 72, and neck end 63. Interior angle 78 between radial wall portion 64 and necked portion 60 is about 90 degrees.

In an example aspect, referring again to FIGS. 1-3, torque converter 10 comprises: axis of rotation A and impeller 18 having impeller shell 16. Impeller shell 16 comprises: radial wall 64; axially extending neck 60 about axis of rotation A; and, elbow portion 62 connecting radial wall 64 and axially extending neck 60 at an angle of about 90 degrees; and, bearing 50, 150 supported by axially extending neck 60. In an example aspect, bearing 50, 150 is disposed axially inward relative to the radial wall in a direction away from a transmission. In other words, bearing 50, 150 is disposed in axial direction AD2 relative to radial wall 64. Furthermore, bearing 50, 150 is disposed in radial direction RD1 relative to axially extending neck 60. In an example aspect, bearing 50, 150 is a roller bearing or a thrust bearing. In another example aspect, bearing 50 is three piece thrust bearing (element 50 in FIG. 3A) comprising first hardened backing washer 51, cage 53 including rollers, and second backing washer 55.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What I claim is:

1. An impeller for a torque converter comprising:
   an axis of rotation;
   an impeller shell comprising:
     a torus portion;
     a radial wall portion;
     an elbow portion;
     an interior portion;
     an inner peripheral surface;
     an outer peripheral surface;
     a first thickness between the inner peripheral surface and the outer peripheral surface;
     a plurality of blades attached to the inner peripheral surface; and,
     an axially extending necked portion connected to the radial wall portion, extending about the axis of rotation and into the interior portion, having:
       a first circumferential surface;
       a second circumferential surface; and
       a second thickness between the first circumferential surface and the second circumferential surface, wherein the second thickness is less than the first thickness of the impeller shell;
   an impeller hub attached to the outer peripheral surface of the radial wall portion of the impeller shell via a weld, wherein the weld is disposed in a region where the radial wall portion meets the torus portion of the impeller shell; and
   a bearing disposed inside the interior portion of the impeller shell and arranged on the first circumferential surface of the axially extending necked portion, wherein the bearing is radially aligned with the impeller hub.

2. The impeller as in claim 1, wherein the elbow portion connects the axially extending necked portion to the radial wall portion at an angle of about 90 degrees.

3. A torque converter comprising:
   an axis of rotation;
   a turbine;
   an impeller comprising an impeller shell having:
     a torus portion;
     a radial wall portion;
     an interior portion;
     an inner peripheral surface;
     an outer peripheral surface;
     a first thickness between the inner peripheral surface and the outer peripheral surface;
     a plurality of blades attached to the inner peripheral surface;
     an axially extending necked portion about the axis of rotation, extending into the interior portion, having:
       a first circumferential surface;
       a second circumferential surface; and,
       a second thickness between the first circumferential surface and the second circumferential surface, wherein the second thickness is less than the first thickness of the impeller shell;
     an elbow portion connecting the radial wall portion and the necked portion;
   an impeller hub attached to the outer peripheral surface of the radial wall portion of the impeller shell via a weld, wherein the weld is disposed in a region where the radial wall portion meets the torus portion of the impeller shell;
   a bearing disposed inside the interior portion of the impeller shell and arranged on the first circumferential surface of the axially extending necked portion, wherein the bearing is radially aligned with the impeller hub; and,
   a stator,
   wherein a space is axially bound by the second circumferential surface.

4. The torque converter as in claim 3, wherein the torque converter is arranged for installation between an engine and a transmission, and wherein the axially extending necked portion extends in a direction toward the engine.

5. The torque converter as in claim 3, wherein the space is arranged for receiving a stator shaft and a transmission input shaft.

6. The torque converter as in claim 3, wherein the necked portion is at an angle of about 90 degrees relative to the radial wall portion.

7. The torque converter as in claim 3 wherein the weld includes a radially outward toe for reduced rotary bend stresses between the toe of the weld and the impeller shell.

8. A torque converter comprising:
   an axis of rotation;
   a turbine;

an impeller comprising an impeller shell having:
  a plurality of blades attached to an inner peripheral surface thereof;
  a radial wall;
  a torus portion;
  an inner peripheral surface;
  an outer peripheral surface;
  a first thickness between the inner peripheral surface and the outer peripheral surface;
  an axially extending neck about the axis of rotation extending into an interior portion, the axially extending neck comprising first and second circumferential surfaces, the second circumferential surface defining an opening arranged for receiving a stator shaft and a transmission input shaft, wherein the axially extending neck includes a second thickness between the first circumferential surface and the second circumferential surface that is less than the first thickness of the impeller shell; and,
  an elbow portion connecting the radial wall and the axially extending neck at an angle of about 90 degrees;
a stator;
an impeller hub attached to the outer peripheral surface of the radial wall of the impeller shell via a weld, wherein the weld is disposed in a region where the radial wall meets the torus portion of the impeller shell; and
a bearing disposed inside the interior portion of the impeller shell and arranged on the first circumferential surface of the axially extending neck extending into the interior portion, wherein the bearing is radially aligned with the impeller hub.

9. The torque converter as in claim 8, wherein the torque converter is arranged for installation between an engine and a transmission, and wherein the bearing is disposed axially between the radial wall and the engine.

10. The torque converter as in claim 8, wherein the bearing comprises at least one of the following: a roller bearing; a thrust bearing; a fluid film thrust bearing and a slide bearing.

11. The torque converter as in claim 10, wherein the bearing is a thrust bearing comprising a first hardened backing washer, a cage including rollers, and a second backing washer.

12. The torque converter as in claim 8 wherein the impeller hub is tubular or forged.

* * * * *